(12) United States Patent
Beck et al.

(10) Patent No.: US 7,010,831 B1
(45) Date of Patent: Mar. 14, 2006

(54) SCREW CONNECTION FOR HINGE PARTS

(75) Inventors: Klaus Beck, Kämpfelbach (DE); Rainer Wagner, Ispringen (DE)

(73) Assignee: OBE Ohnmacht & Baumgärtner GmbH & Co. KG, Inspringen (DE)

( * ) Notice: Subject to any disclaimer, the term of this patent is extended or adjusted under 35 U.S.C. 154(b) by 335 days.

(21) Appl. No.: 10/018,455

(22) PCT Filed: Jul. 6, 2000

(86) PCT No.: PCT/EP00/06373

§ 371 (c)(1),
(2), (4) Date: Mar. 29, 2002

(87) PCT Pub. No.: WO01/04688

PCT Pub. Date: Jan. 18, 2001

(30) Foreign Application Priority Data

Jul. 9, 1999 (DE) .................................. 199 31 837

(51) Int. Cl.
*G02C 5/22* (2006.01)
(52) U.S. Cl. .................. 16/228; 403/156; 403/157
(58) Field of Classification Search .............. 403/22, 403/150, 223–225, 152, 154, 157, 158, 299, 403/282, 156; 411/180, 182, 183, 533; 16/225, 16/228, 239, 240, 244, DIG. 33, 381, 262, 16/273; 351/121, 141, 153
See application file for complete search history.

(56) References Cited

U.S. PATENT DOCUMENTS

| 2,412,120 A | * | 12/1946 | Bouchard | .................. 351/141 |
| 2,678,585 A | * | 5/1954 | Ellis | .............................. 16/228 |
| 2,828,668 A | * | 4/1958 | De Angelis | .................. 351/141 |
| 2,939,168 A | * | 6/1960 | Ferron | .......................... 16/228 |
| 4,076,394 A | * | 2/1978 | Nakamura | ..................... 16/228 |
| 5,308,285 A | * | 5/1994 | Malen et al. | ................ 411/533 |
| 6,106,077 A | * | 8/2000 | Kluge et al. | ................. 411/533 |
| 6,478,521 B1 | * | 11/2002 | Tschunko et al. | ........... 411/533 |

FOREIGN PATENT DOCUMENTS

| EP | 0 345 145 A | * | 12/1989 | |
| EP | 0 384 289 A2 | * | 8/1990 | |
| GB | 2 139 692 A | * | 11/1984 | |
| JP | 02283910 A | * | 11/1990 | ................. 411/533 |
| JP | 08061350 A | * | 3/1996 | |
| WO | WO 94/28454 | * | 12/1994 | |

* cited by examiner

*Primary Examiner*—James R. Brittain
(74) *Attorney, Agent, or Firm*—Morriss O'Bryant Compagni

(57) ABSTRACT

A screw connection for hinge parts, especially of an eyeglass frame, comprising a screw that interconnects the hinge parts that engage one inside the other and that have an upper hinge lobe, a lower hinge lobe, and at least one middle hinge lobe, the screw having a screw head and a screw shank that extends through a first through opening in the upper hinge lobe and extends through a second through opening in the middle hinge lobe, with a thread permitting the screw shank to be screwed into the lower hinge lobe, and comprising a sleeve that surrounds the screw shank, has elastic properties, and interacts with the upper and middle hinge lobes when the screw is in a screwed-in state, whereby the diameter (D2) of the second through opening is less than or equal to the diameter (D1) of the first through opening. The screw connection is distinguished by the fact that the screw (25) has at least one bearing surface for the sleeve (33) with at least one engaging surface (32) that is aligned in the direction of movement in which the screw (25) is unscrewed.

8 Claims, 9 Drawing Sheets

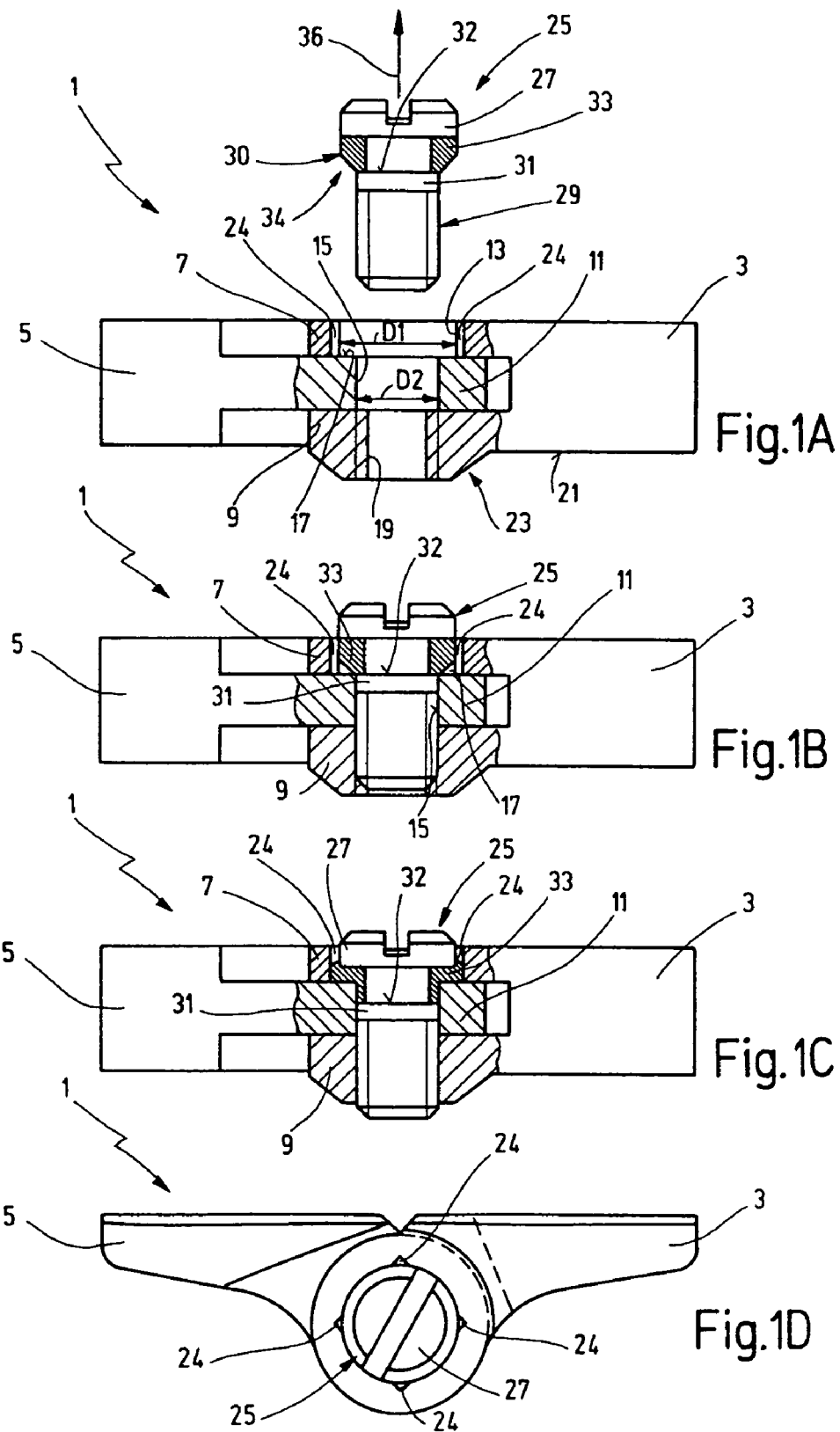

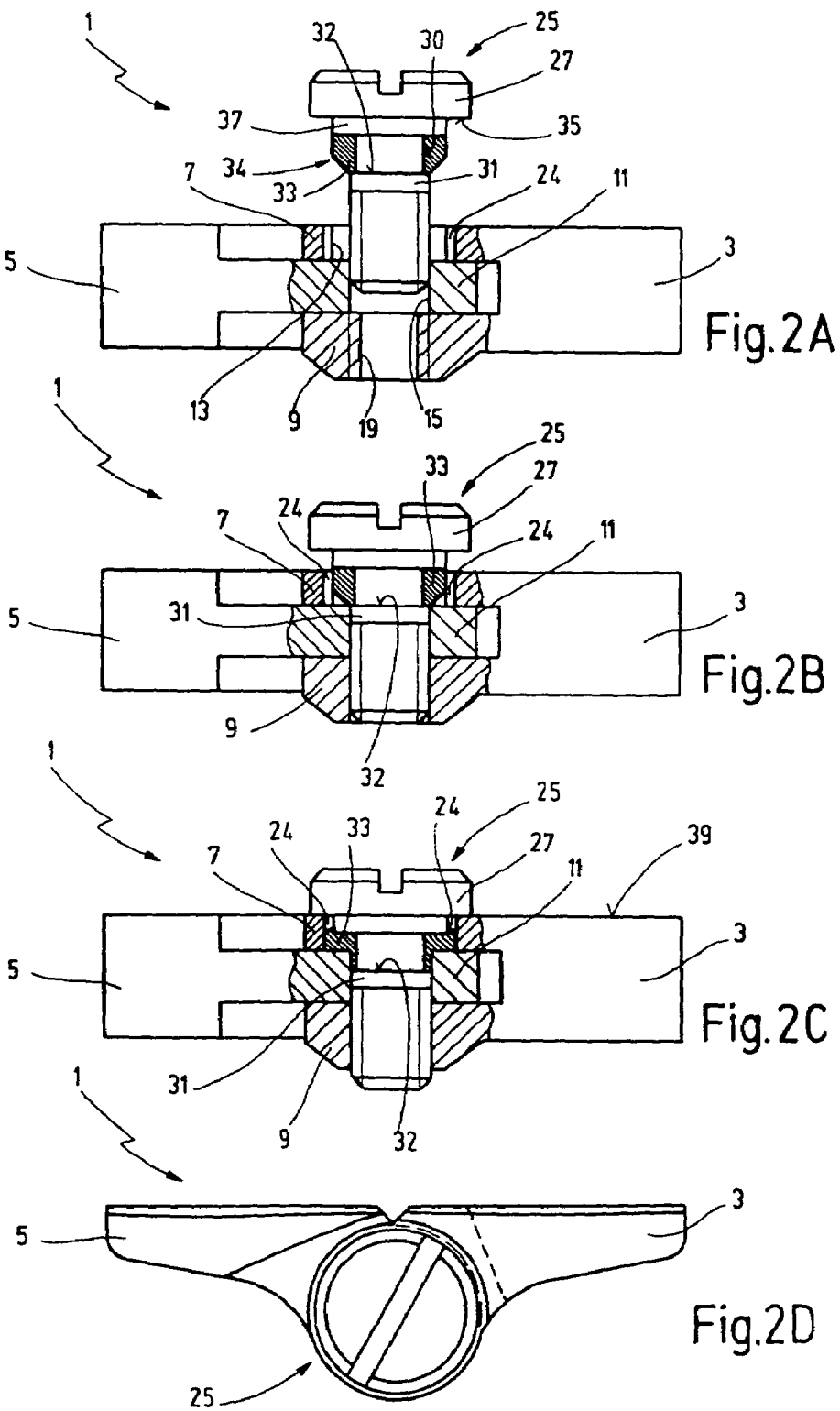

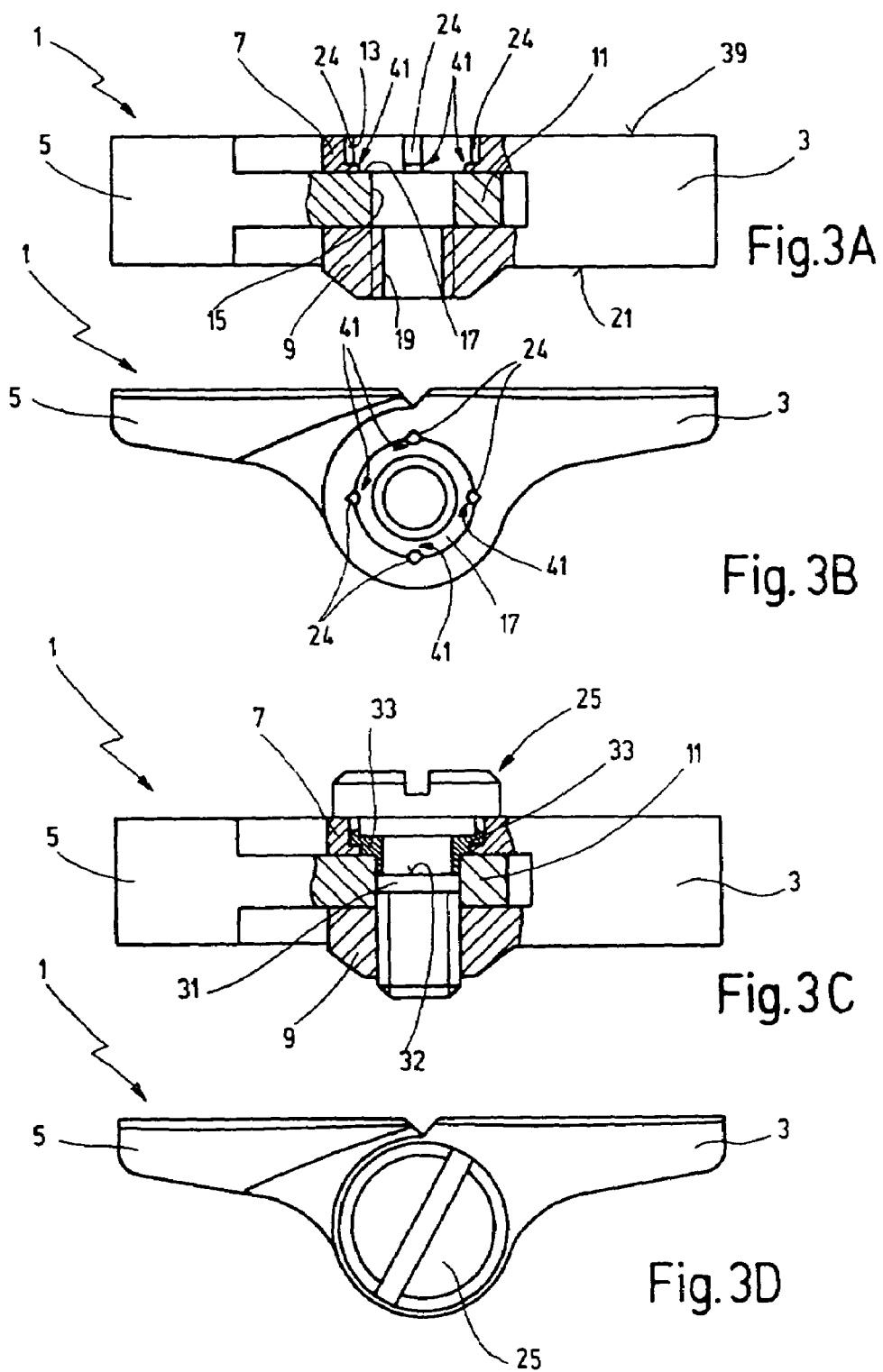

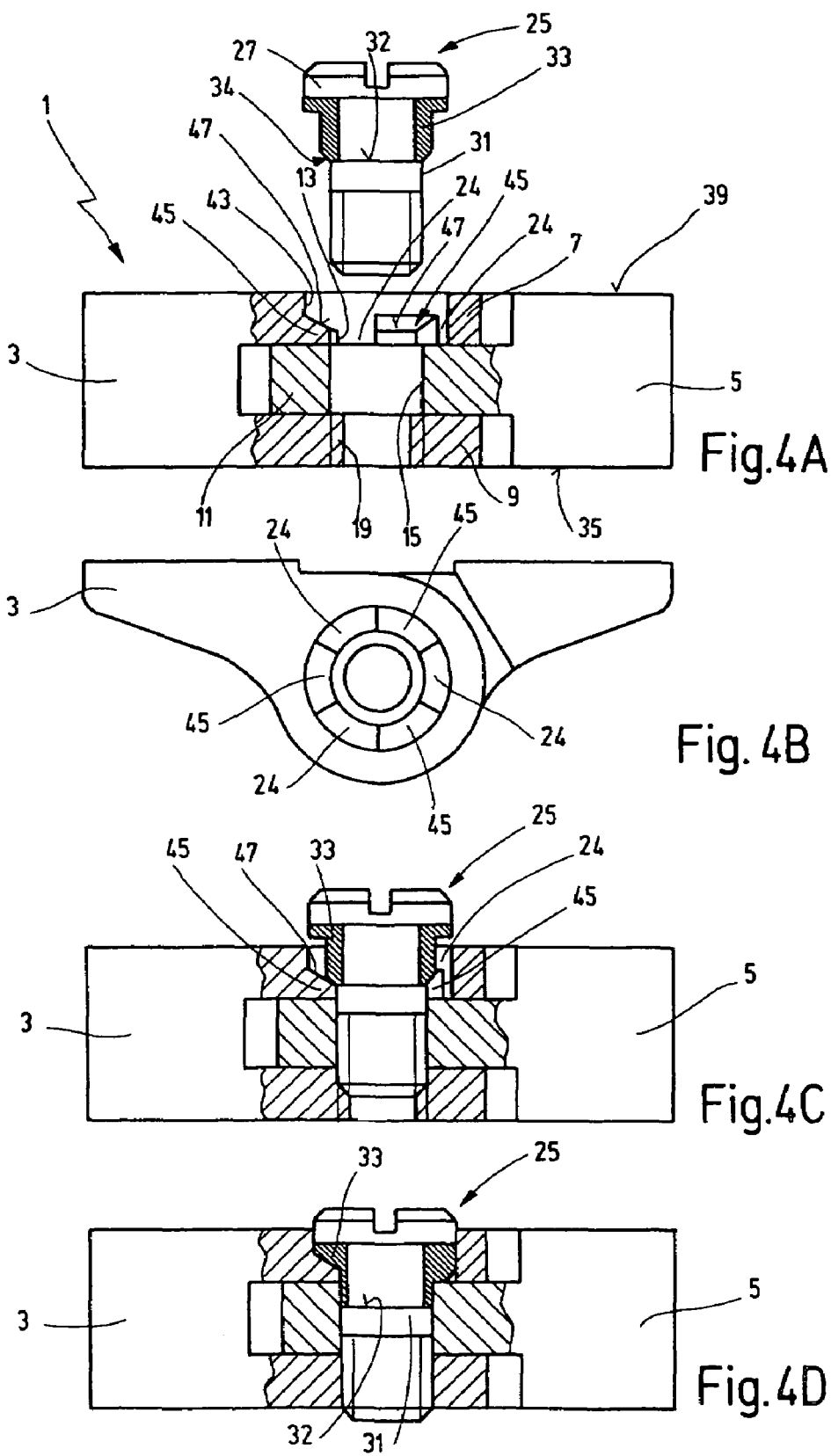

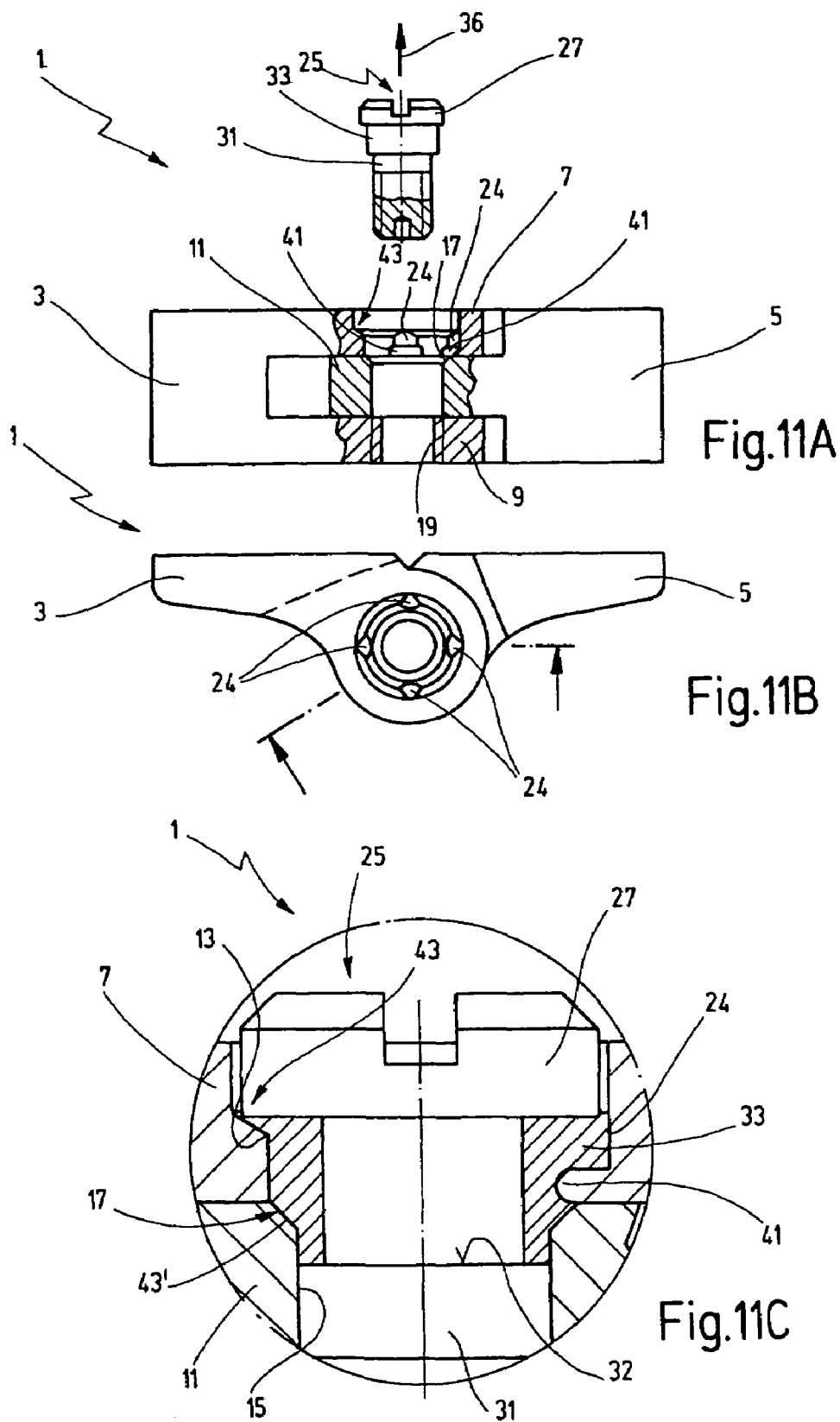

SCREW CONNECTION FOR HINGE PARTS

RELATED APPLICATIONS

Figure 5A:
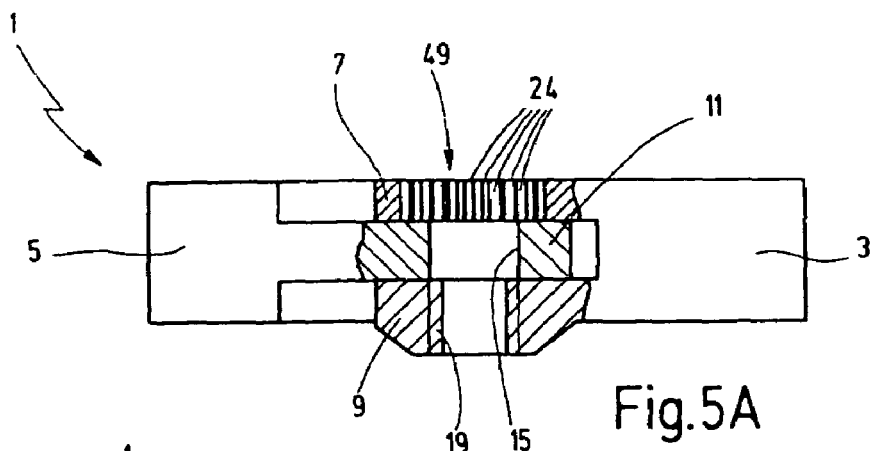

The present application is the U.S. National phase of PCT Application No. PCT/EP00/06373 filed Jul. 6, 2000, which claims priority to German Pat. App. No. 19931837.9 filed Jul. 9, 1999.

The invention relates to a screw connection for hinge parts, especially of an eyeglass frame.

DE-AS 11 96 397 describes a screw connection of the type discussed herein that comprises a screw for connecting two hinge parts. The screw extends through a cylindrical through opening in an upper hinge lobe and extends through a conically tapered through opening in a middle hinge lobe, and a thread permits the screw to be screwed into a lower hinge lobe. The shank of the screw is surrounded by a plastic sleeve that is compressed when the screw is screwed in the axial direction, whereby the sleeve is pressed against the wall of the through opening in the middle hinge lobe and allows the action to be regulated. A disadvantage of this design is that a large material volume is necessary, resulting in a large outer diameter for the sleeve. Miniaturization, which is frequently required, is therefore not possible because of the large diameter of the hinge eyes. It has been shown that when the screw is unscrewed, the sleeve that is pressed into the through openings of the upper and middle hinge lobes remains therein and must be removed with a special tool.

As a result, the sleeve cannot be reused and must be replaced each time the hinge parts are disassembled.

DE-AS 11 17 911 describes an articulated connection comprising a screw that has a screw head, a hinge pin, and a thread. The screw has a sleeve made of injection-molded plastic that creates a soft action for the hinge parts. When the screw is screwed in, the sleeve, which has an overall length that is greater than the height of the associated holes in the hinge lobes, is compressed in the longitudinal direction, whereby the sleeve material is pressed against the hole surfaces and is pushed into the thread of the screw and squeezed into same. Because the sleeve extends into the threads, resulting in high tolerances, the quality of the screw is not reproducible. The screw has the additional disadvantage that during disassembly the screw is screwed out of the sleeve, and the sleeve that has been squeezed into the holes of the hinge lobes must be meticulously removed by the use of tools. The screw therefore cannot be reused.

Furthermore, DE-AS 12 24 058 describes a screw connection comprising a screw surrounded by a plastic sleeve, whereby the through hole introduced in the middle hinge lobe has a larger diameter on its opening that faces toward the upper hinge lobe than the through hole in the upper hinge lobe, so that in its screwed-in state, the sleeve is compressed enough to form a rear engagement. Here as well, the sleeve must be removed from the hole during disassembly of the hinge parts using a tool. Consequently, the sleeve must be replaced with each disassembly. An additional disadvantage is that the through holes in the hinge parts are bored separately and optionally must be provided with a thread, resulting in high production costs for the screw connection.

The object of the invention, therefore, is to provide a screw connection of the type described herein, having a simple and economical design as well as high functional reliability. A further object is that the screw and the sleeve can be reused several times and assure simple disassembly of the hinge parts.

The object is achieved by a screw connection Said screw connection comprises a screw with a threaded screw shank that is surrounded by a sleeve having elastic properties. The sleeve preferably is made of an elastic material such as plastic. In the assembled state, the screw extends with its shank through a first through opening in an upper hinge lobe and through a second through opening in a middle hinge lobe, and is screwed to a lower hinge lobe. As a result, the diameter of the second through opening is less than or equal to the diameter of the first through opening. The screw connection is characterized in that the screw has at least one bearing surface for the sleeve with at least one engaging surface that is aligned in the direction of movement in which the screw is unscrewed. In the context of the present invention, the term "bearing surface" is understood to mean the surface region of the screw on which the sleeve is mounted, for example by injection molding, and which the sleeve at least contacts or adjoins. The term "engaging surface" is understood to mean the region of the bearing surface on which the sleeve rests when the screw connection is loosened, the sleeve thereby being displaced together with the screw in the direction of movement in which the screw is unscrewed and pressed out of the through openings in the hinge lobes. The engaging surface is inclined toward the direction of movement in which the screw is unscrewed at such an angle that during unscrewing, at least one force component acts upon the sleeve in the direction of movement in which the screw is unscrewed, thereby enabling the sleeve to be displaced within the through openings. The sleeve that is mounted on the screw remains thereon, even when the screw connection is loosened. The screw connection may be loosened in a simple manner by the fact that the screw and the sleeve form a quasi-one-piece or one-part functional part. An additional advantage is that the screw with its sleeve is reusable, so that even with multiple screwing and unscrewing actions of the screw it is possible to precisely regulate the action of the hinge. Furthermore, the sleeve protects the screw from loosening on its own.

Because of the different diameters of the first and second through openings, said through openings can be produced together; that is, the through openings are introduced, by boring, for example, into the hinge parts that engage one inside the other. Thus, the lower hinge lobe as well can be provided with a thread. The production of through openings in the hinge lobes for hinge parts placed one inside the other makes it possible to achieve very small tolerances. In another embodiment of the screw connection, the hinge parts are produced separately, for example by the use of MIM (metal injection molding) technology, which allows high precision in the shape and dimension of the parts.

In a preferred exemplary embodiment, the screw connection is provided in the screw shank with at least one annular groove, which preferably is circumferential, in which the sleeve is arranged or in which the sleeve engages with a longitudinal section. In a first variant of the embodiment, the length of the sleeve and the width of the annular groove measured crosswise to the longitudinal extension of the screw are equal or essentially equal, with the result that the sleeve is situated completely in the annular groove. The engaging surface here is formed, for example, by an annular collar on the screw shank formed by the annular groove. In the other variant of the embodiment, the sleeve is mounted on the screw in the region of the annular groove such that a longitudinal section on the inner diameter of the sleeve engages in the annular groove and fills same at least partially, preferably completely. In this embodiment the width of the annular groove is smaller than the length of the sleeve, whereby the engaging surface for the sleeve, which is aligned in the direction of movement in which the screw is unscrewed, is formed by the side wall of the annular groove that is nearer to the screw thread. The engaging surface can be the same size in both variants of the embodiment, since the size thereof depends not on the width of the annular groove, but on its depth, among other factors.

Also preferred is an exemplary embodiment of the screw connection, characterized in that the screw shank has at least one bridge, preferably circumferential, which is at least partially enclosed by the sleeve. The bridge, which preferably is connected as one piece to the screw shank, projects in a radial direction beyond the screw shank, whereby the side wall of the bridge that faces toward the screw head has the engaging surface for supporting the sleeve when the screw is unscrewed.

All the exemplary embodiments of the screw connection have the common feature that when the screw connection is loosened, displacement forces can be applied to the sleeve over the engaging surface in a direction parallel to the longitudinal extension of the screw, with the result that the screw pushes the sleeve out of the through openings of the hinge lobes, as seen in the direction of movement in which the screw is unscrewed.

According to a development of the invention, the screw shank has an annular collar that in the screwed-in state is situated in the middle hinge lobe. In an advantageous embodiment, the annular collar serves as a guide collar and has a diameter that is slightly less than or equal to the diameter of the second through opening in the middle hinge lobe. Preferably, the play between the guide collar and the second through opening is only very slight. In this embodiment, the guide collar is led very precisely into the second through opening, thus assuring that the screw cannot tilt when force is applied to the hinge parts such that a shearing effect is exerted on the screw. As a result, the sleeve, which in the screwed-in state is deformed and which exerts pressure forces on the upper and middle hinge lobes, may be damaged. The screw is thus reliably prevented from coming unscrewed on its own and an action once regulated will not become softer over time and require readjustment. In the screwed-in state the guide collar preferably is situated in the center of the second through opening, thereby assuring optimal support and protection against tilting of the screw, even when force impinges on the hinge parts. Moreover, damage to the second through opening in its edge regions can be eliminated, even for large forces acting on the hinge parts.

Also preferred is an exemplary embodiment of the screw connection, characterized in that the diameter of the screw shank in the region of the annular groove is less than the diameter of the second through opening. In the screwed-in state, the part of the screw shank having the annular groove extends into the second through opening of the middle hinge lobe, so that the sleeve, which is compressed during a screwing action in the direction of its longitudinal central axis, is squeezed together in such a way that the compressed sleeve material is pressed in the axial direction into the annular space formed between the circumferential surface of the second through opening and the part of the screw shank having the annular groove, and fills this annular space at least partially, preferably completely, and the compressed sleeve material is also pressed crosswise to the direction of movement in which the screw is screwed in, into the annular space formed between the circumferential surface of the first through opening in the upper hinge lobe and the screw shank and, optionally, by the underside of the screw head, whereby this annular space is likewise filled at least partially by the sleeve material. The compressed sleeve presses over at least a portion of the circumferential surface up to a partial height of the first and second through openings and—as seen in the direction of movement in which the screw is screwed in—on the upper side of the middle hinge lobe. Varying the pressure forces acting on the middle hinge lobe by screwing in more tightly or partially unscrewing the screw allows the action of the hinge parts to be regulated and precisely adjusted.

An exemplary embodiment of the screw connection is also preferred in which a longitudinal groove is provided in the circumferential surface of the first through opening, running parallel or essentially parallel to the direction of movement in which the screw is screwed and unscrewed and protecting the sleeve from twisting about its longitudinal central axis. When the screw is being screwed in, the sleeve material is pushed into the longitudinal groove, preferably over a certain partial height of the longitudinal groove. In this manner a positive fit between the sleeve and the upper hinge lobe is achieved that prevents the sleeve from rotating with the screw when the screw connection is loosened. When the screw is unscrewed, the sleeve therefore does not rotate with the screw, but instead is displaced only in the direction of movement in which the screw is unscrewed on account of the sleeve being supported by the engaging surface of the bearing surface. Relative rotational motion between the screw and the sleeve occurs during the unscrewing action. In a further embodiment, many longitudinal grooves with small spacings between each are introduced in the circumferential surface of the first through opening, with said longitudinal grooves being formed by a knurl, for example.

The longitudinal groove(s) for hinge parts placed one inside the other can be produced preferably without cutting, for example by punching, stamping, or the like. In another variant of the embodiment of the screw connection, the hinge parts are produced individually, preferably by the use of MIM technology, which assures high precision of the parts.

The hinge parts produced by sintering are fabricated separately. It has been shown that in particular the variant of the embodiment of the screw connection in which the circumferential surface of the first through opening in the upper hinge lobe is provided with a knurl can be advantageously produced by MIM technology.

In an advantageous embodiment of the screw connection, the outer diameter of the sleeve is slightly less than or equal to the diameter of the first through opening, so that the torque required for screwing in is relatively small. Setting of the screw is simplified as well. It is understood that in another exemplary embodiment, the outer diameter of the sleeve can also be greater or significantly less than the diameter of the first through opening. The sleeve, which is produced from an elastic material such as plastic, can have a wide variety of shapes. In an advantageous exemplary embodiment, the sleeve has a circular or annular-shaped cross section. Of course, sleeves having a polygonal cross section, for example a square cross section, may also be used. When the screw is being screwed in, it is important that that the sleeve can be deformed at least enough so that the sleeve material flows into the through opening in the middle hinge lobe and optionally into at least one longitudinal groove in the circumferential surface of the first through opening, and that the sleeve material presses against at least a portion of the circumferential surface of the through opening in the upper hinge lobe and optionally the upper side of the middle hinge lobe.

Further advantageous embodiments of the screw connection result from the remaining subclaims.

Figure 7:
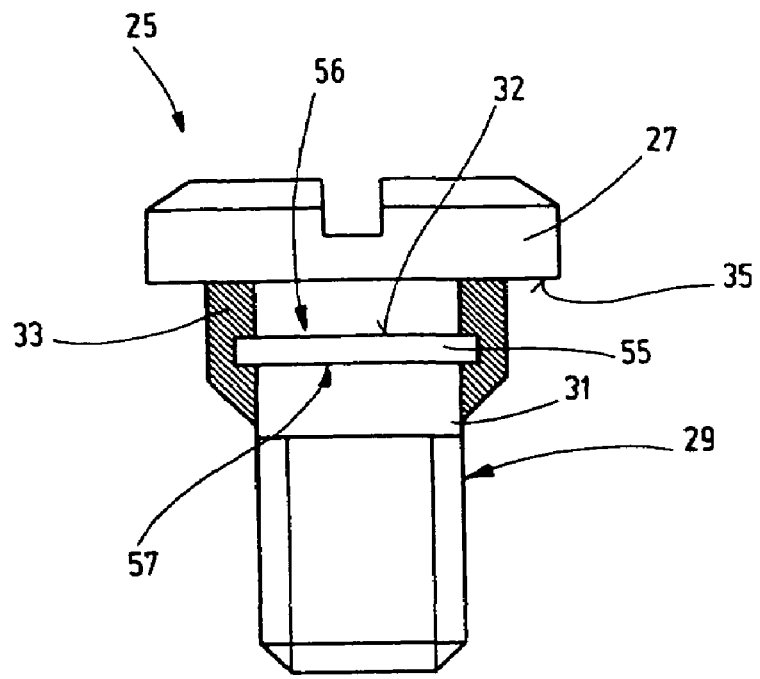

The invention is explained in more detail below with reference to the drawings, which show the following:

FIG. 1A a total of three cross sections and one top view of through 1D a first exemplary embodiment of a screw connection for hinge parts;

FIG. 2A a total of three cross sections and one top view of through 2D a second exemplary embodiment of the screw connection;

FIG. 3A for each figure, a view of a third exemplary through 3D embodiment of the screw connection;

FIG. 4A for each figure, a view of a fourth exemplary through 4B embodiment of the screw connection;

FIG. 5A a top view and a cross section of a fifth and 5B exemplary embodiment of the screw connection;

FIG. 6a cross section through a sixth exemplary embodiment of the screw connection;

FIG. 7 four exemplary embodiments of a screw; and through 10B

FIG. 11a cross section, a top view, and a cutaway view through 11c of a seventh exemplary embodiment of the screw connection, in enlarged scale.

FIG. 1A shows a longitudinal section through a screw connection 1 for hinge parts, of an eyeglass frame, for example, that comprises a two-lobed hinge part 3 and a one-lobed hinge part 5 that are placed one inside the other. The two-lobed hinge part 3 is connected to the eyeglass frame, for example, and the one-lobed hinge part 5 is connected to a side piece, for example. The two-lobed hinge part 3 has an upper hinge lobe 7 and a lower hinge lobe 9, and the one-lobed hinge part 5 has a middle hinge lobe 11 that is arranged between the upper and lower hinge parts 7, 9, preferably with little play. A first through opening 13 is introduced in the upper hinge lobe 7, and a second through opening 15 is introduced in the middle hinge lobe 11, such that the longitudinal axes of said through openings align with one another. The through openings 13, 15 here are designed with an annular cross section. In another exemplary embodiment, said through openings can also have a polygonal cross section, for example a square cross section, or a circular cross section. The diameter D1 of the first through opening 13 is larger than the diameter D2 of the second through opening 15, thereby forming an annular bearing shoulder 17.

A through threaded hole 19 is introduced in the lower hinge lobe 9 in such a way that the longitudinal axis of the through threaded hole aligns with the longitudinal axes of the first and second through openings 13, 15. From the underside 21 of the two-lobed hinge part 3 in the region of the lower hinge lobe 9 a conically running projection 23 arises by which the depth of the threaded hole 19 is enlarged.

In this exemplary embodiment, a total of four longitudinal grooves 24 (FIG. 1D) are introduced in the circumferential surface of the first through opening 13, running parallel to the longitudinal center axis of the through opening 13 and in this case having a wedge-shaped cross section. The longitudinal grooves 24 extend through the entire through opening 13. The following discussion will explain the function of the longitudinal grooves 24 in more detail.

The screw connection 1 also comprises a screw 25 that has a screw head 27 and a screw shank 29 that is provided with a thread. A circumferential annular groove 30 is introduced in the screw shank 29, thereby forming an annular collar 31 on the screw shank 29. As shown in FIG. 1A, the annular groove 30 extends all the way to the underside of the screw head 27. The annular collar 31 is designed as a guide collar; that is, its diameter is essentially equal to or slightly less than the diameter D2 of the second through opening 15, as shown in FIG. 1C, which represents the screw 25 in the screwed-in state. Furthermore, FIG. 1C shows that the outer diameter of the screw head 27 is less than the diameter D1 of the first through opening 13, whereby the screw head 27 is displaced when the screw is screwed into the first through opening 13, and is partially accepted by said through opening.

The difference in diameters of the screw shank 29 in the region of the annular groove 30 and of the annular collar 31 forms a circumferential engaging surface 32 having the shape of an annular ring, which in this exemplary embodiment runs crosswise to the direction of movement in which the screw 25 is screwed or unscrewed. The size of the flat engaging surface 32 depends on the difference in diameters of the screw shank 29 in the region of the annular groove 30 and of the annular collar 31. In the annular groove 30 of the screw shank 29 a sleeve 33 is arranged, preferably made of an elastic material, for example plastic, that has an annular-shaped cross section. At its one end, the sleeve 33 abuts the underside of the screw head 27, and at its other end rests against the engaging surface 32 that is aligned in the direction of movement in which the screw is unscrewed (arrow 36). The sleeve 33 may also be constructed to be long enough so as to be fixed between the screw head 27 and the engaging surface 32, thereby being impinged upon by forces aligned in the axial direction. At its end that faces toward the annular collar 31, the one-piece sleeve 33 has a conical taper 34 in the direction of the thread. In this embodiment the forces acting on the middle hinge lobe 11 increase gently as the screw is being screwed in. As a result of the progressive increase in the pressure force acting on the side of the middle hinge lobe 11 that faces toward the sleeve 33, an unacceptably large deformation of the middle hinge lobe 11 can be avoided.

The length of the sleeve 33, which preferably is injection-molded onto the screw shank 29, here corresponds essentially to the distance between the underside of the screw head 27 and the annular collar 31. The sleeve 33 in the region of its longitudinal section having a circular cylindrical cross section has an outer diameter that in this preferred exemplary embodiment is slightly less than or equal to the diameter D1 of the first through opening 13. Hence, only a slight torque is required for screwing the screw 25 into the first thread of the threaded hole 19.

During the screwing action, the sleeve 33 is compressed in the axial direction and the sleeve material is pressed into the longitudinal grooves 24, with the result that the longitudinal grooves 24 are filled to a portion of their height, as shown in FIG. 1C. Compression of the sleeve 33 in the axial direction of the longitudinal grooves 24 results in a positive fit, which protects the sleeve 33 from twisting about its longitudinal center axis. The anti-twist protection is still effective when, after the screw 25 has been screwed in, the screw connection 1 is fully loosened, or only the screw 25 is slightly loosened, for the regulation of action, for example.

The following discussion explains the function of the screw connection 1 in more detail. When the screw 25 is screwed into the threaded hole 19, the sleeve 33 enters the first through opening 13 in the upper hinge lobe 7. As a result of the small outer dimensions of the sleeve 33, practically no pressure forces act on the sleeve casing. FIG. 1B shows the screw 25 in a position in which it is screwed so far into the threaded hole 19 that the sleeve 33, at its tapered end 34, abuts the bearing shoulder 17 that is formed by the differences in diameters of the through openings 11, 13. In this position the annular collar 31 is already situated in the second through opening 15 in the middle hinge lobe 11. Both hinge parts 3, 5 are thereby brought into exact alignment with one another before the sleeve 33 is compressed in the direction of its longitudinal center axis. With further screwing, the screw 25 goes from the position represented in FIG. 1B to the position represented in FIG. 1C, in which the screw head 27 is partially accepted by the first through opening 13 in the upper hinge lobe 7. The sleeve 33, which presses at its one end against the underside of the screw head 27 and at its other end against the bearing shoulder 17, is thereby squeezed together such that the sleeve material extending in the radial and the axial directions is pressed into the volume between the circumferential surface of the second through opening 15 and the portion of the screw shank 29 that has the annular groove 30 that receives the sleeve 33, and said sleeve material completely fills this area. In addition, the sleeve 33 is pressed against the bearing shoulder 17 that is formed by the stepped holes (through openings 13, 15) and thus against the upper side of the middle hinge lobe 11 and into the longitudinal grooves 24 in the first through opening 13 of the upper hinge lobe 7, as well as against the circumferential surface regions of the first through opening 13 that lie between the longitudinal grooves 24. Since the sleeve 33 is made of an easily deformable, elastic material, the screw head 27 is partially pressed into the sleeve 33 that rests on the bearing shoulder 17 and fills a portion of the first through opening 13. The sleeve 33 is thus deformed in such a way that the sleeve material flows into the annular space formed between the outer side of the screw head 27 and the circumferential surface of the first through opening 13. Furthermore, FIG. 1C shows that in the screwed-in state, the annular collar 31 is situated approximately in the center of the middle hinge lobe 11, whereby external forces acting on the hinge parts 3, 5 pass into the annular collar 31 of the screw 25 and are absorbed by same, without tilting the screw 25.

The sleeve 33, which is moved during the screwing action in the direction of movement in which the screw is screwed, impinges on a circumferential surface region of the second through opening 15 and on a circumferential surface region of the first through opening 13 with pressure forces that in this exemplary embodiment run crosswise to the direction of the screwing action. Furthermore, forces that are aligned in the direction of movement in which the screw is screwed are applied to the upper side of the middle hinge lobe 11, via the bearing shoulder 17. The forces that are applied via the sleeve 33 to the middle hinge lobe 11 in this case run perpendicular to one another and allow the action of the hinge parts to be regulated. The further the screw 25 is screwed in, the greater the forces become that act on the middle hinge lobe 11. When the screw is partially unscrewed, the forces are reduced, thereby providing a softer action. After the screw 25 has been screwed in, and the sleeve 33 has been deformed in the manner described above and has been squeezed into the various spaces formed between the hinge parts 3, 5 and the screw 25, the action can be precisely regulated by screwing or unscrewing the screw. In addition, compression of the sleeve 33 in the direction of its longitudinal center axis protects the screw 25 from loosening on its own. Regulation of action and protection of the screw are achieved by using the screw connection 1 described with reference to FIGS. 1A through 1D.

In the screwed-in state, the sleeve 33 always rotates along with the two-lobed hinge part 3 and the screw 25 on account of the positive fit (longitudinal grooves 24) between the sleeve 33 and the two-lobed hinge part 3. A further advantage of the screw connection 1 is that only very slight torque is transmitted to the screw 25 from the one-lobed hinge part 5. The screw connection 1 can also be used for very thin hinge parts with preferably thin hinge lobes.

When the screw connection 1 is loosened, the engaging surface 32 of the screw shank 29 acts as an abutment for the sleeve 33, which on account of the positive fit of same with the longitudinal grooves 24 is protected from twisting about its longitudinal center axis. The positive fit between the sleeve 33 and the longitudinal grooves 24 is generally maintained even after the screw 25 is loosened, since the sleeve is plastically, and thus irreversibly, deformed at least in sections the first time the screw 25 is completely screwed in. During the unscrewing action the sleeve 33, with its end that faces toward the screw head 27, is supported by the engaging surface 32 that is aligned in the direction of movement in which the screw 25 is unscrewed (arrow 36), so that the sleeve 33 is displaced in the direction of movement in which the screw 25 is unscrewed. As a result of the sleeve 33 being pressed out of the through openings of the hinge parts, aided by the engaging surface 32, the sleeve 33 is prevented from screwing into the thread of the screw 25.

In another exemplary embodiment of the screw connection 1, not shown in the figures, the sleeve 33 is only elastically deformed, so that after the screw is loosened the positive fit with the hinge part 3 is resumed.

FIGS. 2A through 2D each show a view of a further embodiment of the screw connection 1. Identical parts are denoted by the same reference numbers, so that in this respect reference is made to FIGS. 1A through 1D. The following discussion will focus only on the differences.

The screw 25 has on the underside 35 of its screw head 27 a cylindrical projection 37, the diameter of which in this case corresponds approximately to the outer diameter of the sleeve 33. The sleeve 33, which is arranged in the annular groove 30 introduced in the screw shank 29, is supported at its one end by the cylindrical projection 37 during the screwing action, and is supported at its other end by the engaging surface 32 of the annular collar 31 during the unscrewing action. In the fully screwed-in state (FIG. 2C), the underside 35 of the screw head 27 lies against the upper side 39 of the two-lobed hinge 3 and the upper hinge lobe 7. To increase the pressure forces acting on the sleeve 33 while in this position in the direction of movement in which the screw is screwed or unscrewed, the upper hinge lobe 7 can be pressed in by the screw head 27 at least in the edge region of said upper hinge lobe by screwing the screw in further. The distance between the cylindrical projection 37 and the bearing shoulder 17 of the stepped hole can thus be reduced, thereby increasing the forces acting on the sleeve 33. The screw 25 represented in FIGS. 2A through 2C is used with thin-walled hinge parts, for example.

FIGS. 3A through 3D each show a view of a third exemplary embodiment of the screw connection 1, with the screw 25 being represented in the screwed-in state only in FIGS. 3C and 3D. Parts matching those described in the previous figures are denoted by the same reference numbers, so that in this respect reference is made to the preceding description.

Four longitudinal grooves 24, running parallel to the longitudinal center axis of the first through opening 13, are arranged in the circumferential surface of the first through opening 13 of the upper hinge lobe 7, said longitudinal grooves being introduced by an operating method without cutting, for example by punching or stamping, preferably with the hinge parts 3, 5 fitted together. As a result of the sectional deformation of the circumferential surface of the first through opening 13 by the upper side 39 of the hinge, at least one nib 41 running radially in the direction of the center of the through opening 13 is formed on the edge region of the through opening 13 that faces toward the middle hinge lobe 11. Preferably a plurality of nibs 41, which in this case lie on the bearing shoulder 17, is provided that act as catches with respect to the sleeve 33.

FIGS. 4A through 4D each show a view of a further exemplary embodiment of the screw connection 1. Identical parts are denoted by the same reference numbers, so that in this respect reference is made to the description for the preceding figures. In the first through opening 13 in the upper hinge lobe 7, the diameter of which is the same as the diameter of the second through opening 15 in the middle hinge lobe 11, is introduced an indentation 43, on the side that faces toward the middle hinge lobe 11, that extends to approximately the center of the upper hinge lobe 7. In addition, in this exemplary embodiment a total of three longitudinal grooves 24 are introduced in the circumferential surface of the first through opening 13, for example by punching, which are designed as sectors of a circle, as seen in the top view (FIG. 4B).

The three longitudinal grooves 24 running parallel to the direction of movement in which the screw is screwed or unscrewed are of equal size; that is, they extend over equal angular ranges of the through opening 13. The longitudinal grooves 24 have a star-shaped arrangement; that is, they are disposed over the circumference of the first through opening 13 at a spacing of 120 from one another. The longitudinal grooves 24 form three wall segments 45 that are designed as sectors of a circle, as seen in the top view. It can be seen from FIG. 4A that the upper side 47 of the wall segments 45 is inclined toward the direction of movement in which the screw is screwed or unscrewed. The angle of inclination here is approximately as large as the angle of the taper 34 of the sleeve 33, so that flat contact is made between the sleeve 33 and the wall segments 45 without any deformation of the sleeve 33 (FIG. 4C). The number of longitudinal grooves 24, and thus the number of wall segments 45, can be varied, and in another exemplary embodiment can be two, or more than three, for example four, five, or six.

In the exemplary embodiment represented in FIGS. 4A through 4D, the sleeve 33 has on its end that faces toward the screw head 27 a region of larger diameter, said diameter being approximately equal to the diameter of the indentation 43 and that of the screw head 27. Adjoining the region of larger diameter is a region of smaller diameter, said diameter being slightly greater than the diameter of the annular collar 31. When the screw 25 is screwed in, the sleeve 33 is supported at its end having the region of larger diameter by the underside of the screw head 27, and at its other end is pressed against the upper side 47 of the wall segments 45. The sleeve 33 is thereby compressed in such a way that the sleeve material is pressed from above, and thus in the axial direction, into the longitudinal grooves 24 to provide the sleeve 33 with anti-twist protection, and is pressed into the annular space formed between the circumferential surface of the second through opening 15 in the middle hinge lobe 11 and the screw shank 29. By virtue of the fact that the first and second through openings 13, 15 have equal diameters, forces are applied via the sleeve 33 to the upper side 39 of the middle hinge lobe 11 only in the region of the longitudinal grooves 45. Moreover, the sleeve material—as with all the other exemplary embodiments of the screw connection 1—is pressed against at least a portion of the circumferential surfaces of the through openings 13, 15.

The hinge parts 3, 5 of the screw connection 1 described with reference to FIGS. 4A through 4D have the advantage that conventional screws can be used, which is particularly advantageous for optometrists.

Figure 5B:
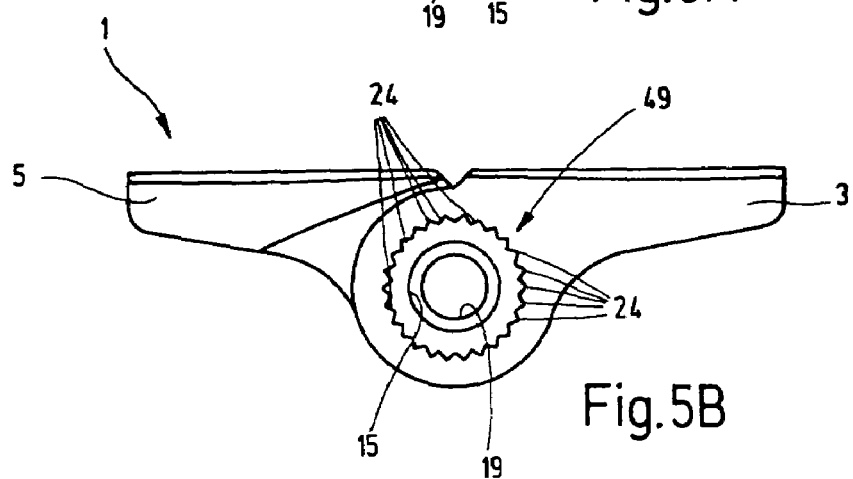

FIGS. 5A and 5B show a partial cutaway side view and a top view of a fifth exemplary embodiment of the screw connection 1, which is distinguished from the exemplary embodiment described with reference to FIGS. 1A through 1D solely by the fact that in the first through opening 13 in the upper hinge lobe 7 are introduced a large number of longitudinal grooves 24 that run parallel to the direction of movement in which the screw is screwed and unscrewed. As a result of the very small intervals between the longitudinal grooves 24, a knurl 49 is formed into which the material of the sleeve 33, which is compressed to form a positive fit when the screw is screwed in, is pressed or flows. In a preferred exemplary embodiment, the hinge parts 3, 5 are produced using MIM technology.

Figure 6:
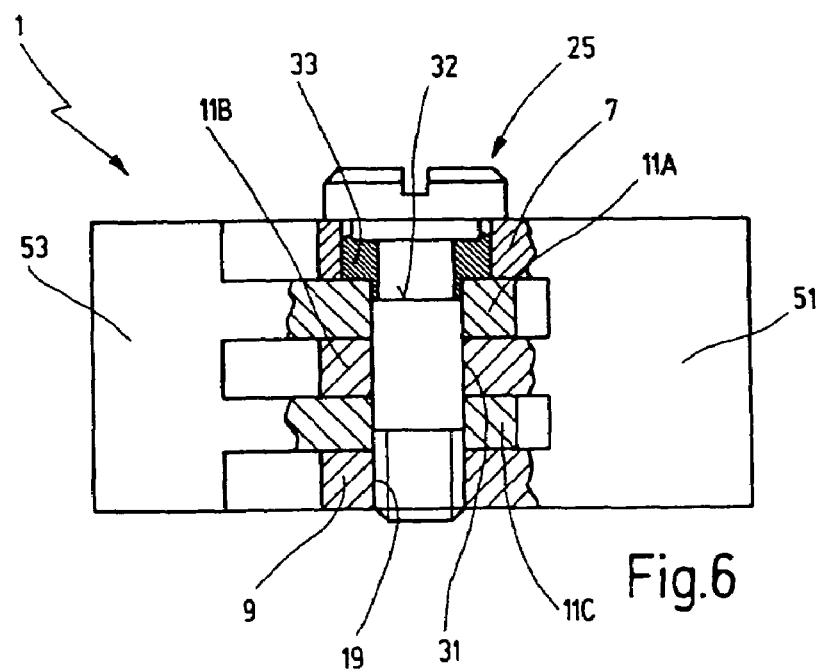

FIG. 6 shows a cross section through a sixth exemplary embodiment of the screw connection 1, comprising a three-lobed hinge part 51 and a two-lobed hinge part 53 that fit one inside the other and are connected by means of a screw 25. Identical parts are denoted by the same reference numbers, so that in this respect reference is made to the description for the preceding figures. Middle hinge lobes 11A, 11B, and 11C are arranged between the upper hinge lobe 7 and the lower hinge lobe 9. The annular collar 31, which preferably is designed as a guide collar, is positioned in all the middle hinge lobes 11A, 11B, and 11C when the screw 25 is completely or essentially completely screwed in, and has a corresponding length. Tilting of the screw 25 in the through openings of the hinge lobes is thereby prevented, so that when forces impinge on the hinge lobes 51, 53 these forces are not transmitted to the sleeve 33 of the screw 25, which otherwise could lead to damage and impaired function of the sleeve 33.

FIG. 7 shows a further exemplary embodiment of the screw 25 on which a sleeve 33 made of an elastic material is mounted. The screw shank 29 has a circumferential, annular-shaped bridge 55 that is completely surrounded by the sleeve 33. The sleeve 33, which conically tapers in the direction of the thread of the screw 25, partially covers the bearing surface of the annular collar 31, which in the screwed-in state of the screw 25 is situated in at least one middle hinge lobe. The engaging surface 32, which supports the sleeve 33 when the screw connection is loosened such that the sleeve 33 is pressed from the hinge lobes by the screw, in this case is formed on the upper side 56 of the annular-shaped bridge 55. The bridge 55 provides a relatively large support surface for the sleeve 33, and also assures a secure hold of the sleeve 33 on the screw shank 29. When the sleeve 33 is compressed as the screw 25 is screwed in, the underside 35 of the screw head 27 and the underside 57 of the bridge 55 each form an abutment against which the sleeve 33 is pressed.

Figure 8:
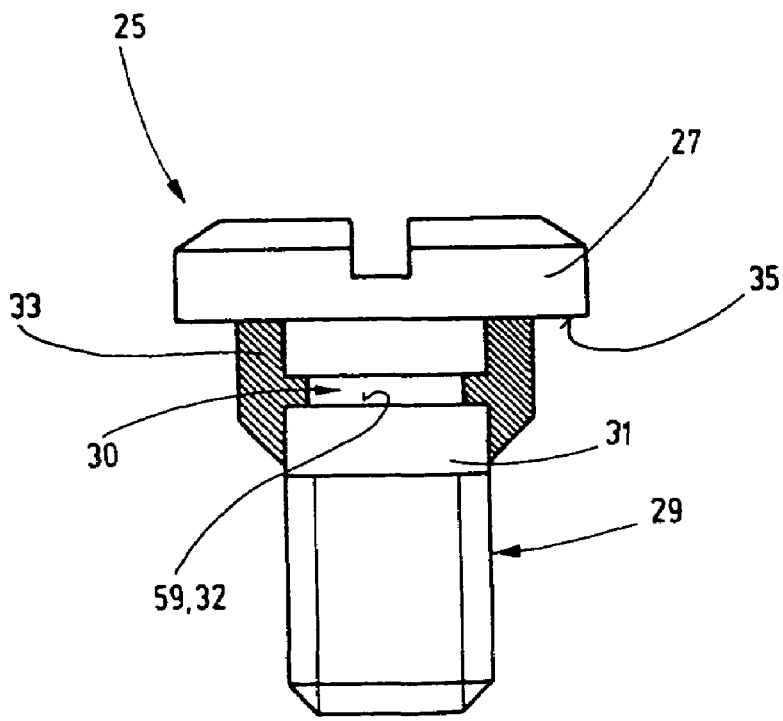

FIG. 8 shows a side view of a further exemplary embodiment of the screw 25, the screw shank 29 of which is provided with an annular groove 30 whose width—seen crosswise to the longitudinal extension of the screw 25—is less than the length of the sleeve 33. Said annular groove is provided on the screw shank 29 in such a way that the annular groove 30 is filled by the sleeve material to form a positive fit. In the representation in FIG. 8, the lower side wall 59 of the circumferential annular groove 30 forms the engaging surface 32 upon which the sleeve 33 is supported when the screw is unscrewed.

The exemplary embodiments of the screw 25 described with reference to FIGS. 7 and 8 can be employed in conjunction with the exemplary embodiments of the screw connection 1 described with reference to FIGS. 1 through 6 without the need to alter the hinge parts.

Figure 9A:
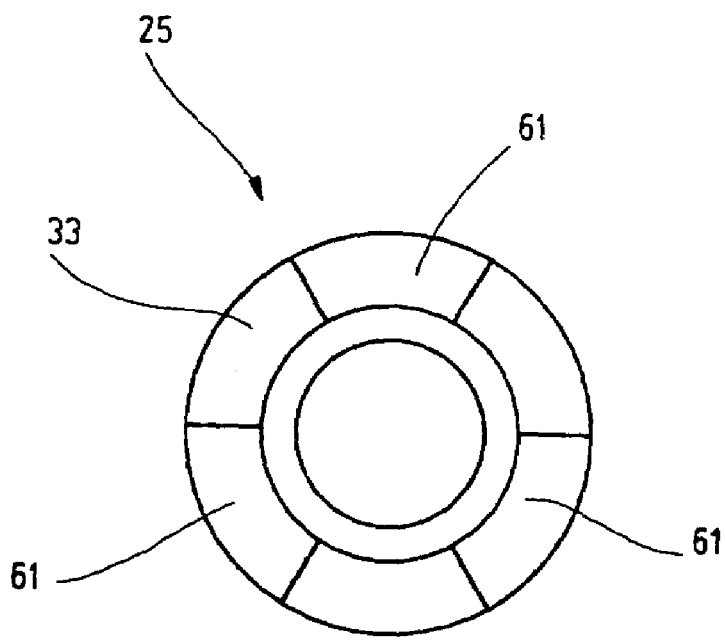
Figure 9B:
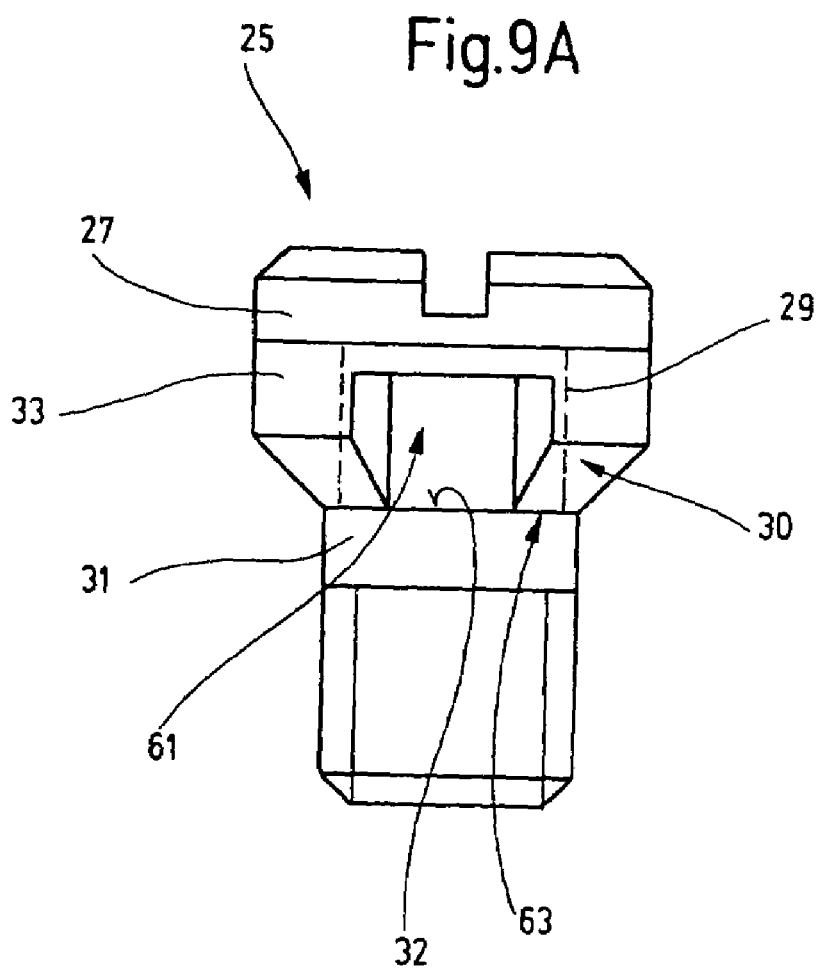

FIGS. 9A and 9B each show a view of a further exemplary embodiment of the screw 25 for the hinge parts 3, 5 represented in FIGS. 4A through 4D. The sleeve 33 mounted on the screw 25 has a plurality of recesses 61—in this exemplary embodiment a total of three recesses—that open toward the front face 63 of the sleeve 33 that faces toward the thread of the screw 25. The inner contour of the recesses 61 corresponds to the outer contour of the wall segments 45 in the upper hinge lobe 7 (FIGS. 4A through 4D), so that in the screwed-in state the wall segments 45 are situated in the recesses 61. In this exemplary embodiment, the sleeve 33 rotates along with the screw 25 at the beginning of the screwing action until the sleeve has been displaced far enough on the wall segments 45 in the through opening 13 in the upper hinge lobe 7 so that the wall segments 45 engage in the recesses 61 of the sleeve 33, thus preventing the sleeve 33 from rotating further with the screw 25. The sleeve 33, which is protected from twisting by the wall segments 45, rests at its one end against the underside of the screw head 27 and, when the screw 25 is screwed in further, is displaced by the screw in the direction of movement in which the screw is screwed in. The sleeve 33 is thus placed, in effect, like a cap on the wall segments 45 in the upper hinge lobe 7, with the recesses 61 preferably being large enough that this placement occurs essentially force-free. The sleeve 33 is not compressed until it is displaced far enough over the wall segments 45 that said sleeve 33 is pressed against the bearing shoulder 17, for example, and is clamped between said bearing shoulder and the underside of the screw head. In this exemplary embodiment, it is particularly advantageous that only a very small force is needed to protect the sleeve 33 from twisting, since the sleeve material does not have to be pressed from above into the longitudinal grooves 24 in the circumferential surface of the first through opening 13, as is the case, for example, for the screw connection 1 described with reference to the preceding figures.

Figure 10A:
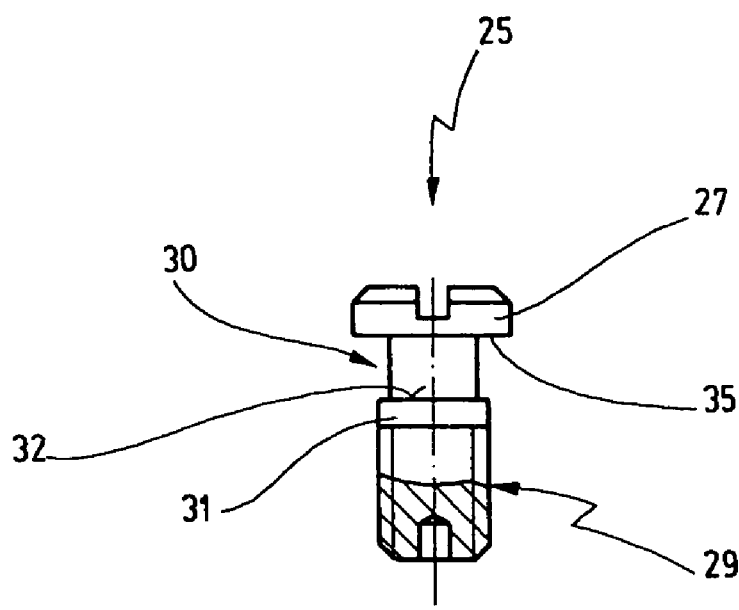
Figure 10B:
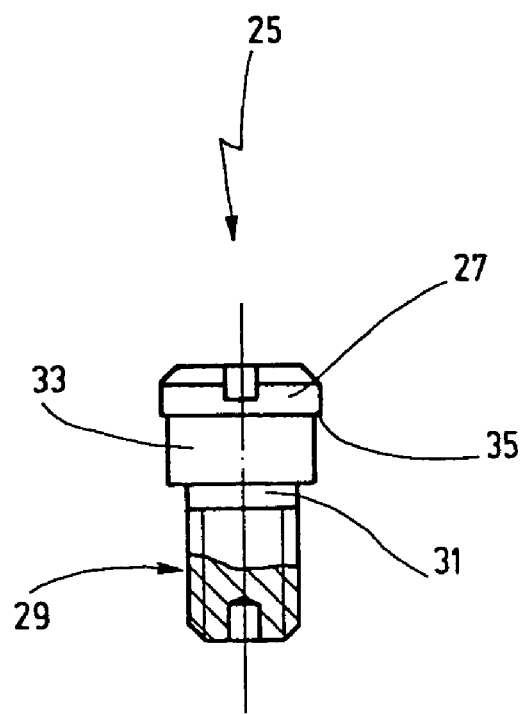

FIG. 10A shows a further exemplary embodiment of the screw 25, namely a slug, that has no elastic sleeve 33. The screw 25 has a circumferential annular groove 30 that directly adjoins the underside 35 of the screw head 27. FIG. 10B shows the screw 25 with an injection-molded sleeve 33. The sleeve 33 has a circular cylindrical design without tapering. The outer diameter of the sleeve 33 is smaller than the outer diameter of the screw head 27, but larger than the diameter of the annular collar 31.

FIGS. 11A and 11B show a longitudinal section and a top view, respectively, of a further exemplary embodiment of the screw connection 1. Parts that have already been described with reference to the preceding figures are denoted by the same reference numbers, so that in this respect reference is made to FIGS. 1 through 10B. It can be seen that the upper hinge lobe 7 has four longitudinal grooves 24 that are introduced from the upper side 39 of the hinge into the circumferential surface of the first through opening 13, as in the exemplary embodiment of the screw connection 1 described with reference to FIGS. 3A through 3D. A nib 41, which functions as a catch, is thereby formed for each longitudinal-groove by the displaced material of the upper hinge lobe 7 and respectively rests on the upper side of the middle hinge lobe 11. In addition, an indentation 43 is introduced from the upper side of the hinge part into the first through opening 13. The base of the indentation 43 is situated in approximately the center of the upper hinge lobe.

The second through opening 15 as well is provided with an indentation 43' in the middle hinge lobe 11, which is introduced in the upper side of the middle hinge lobe 11. The shape and depth of the indentation 43' are chosen such that no bearing shoulder seat is formed on the upper side of the one-lobed hinge part, despite the difference in diameters between the first and second through openings 13, 15. Instead, the bearing shoulder 17 runs at an angle to an imaginary horizontal line, corresponding to the shape of the indentation 43'.

FIG. 11C shows an enlarged section of the screw connection 1 described with reference to FIGS. 11A and 11B, in the assembled state; that is, the screw 25 is screwed into the threaded hole 19. The embodiment of the screw 25 corresponds to the exemplary embodiment of the screw 25 described with reference to FIGS. 10A and 10B. FIG. 11C shows that when the screw 25 is screwed in, the sleeve 33 adjoining the threaded hole 19 at the indentations 43 and 43' as well as at the nibs 41 is squeezed together in such a way that the sleeve material is pressed into the longitudinal grooves 24 and into the gap between the screw 25 and the first and second through openings 13, 15 in the upper and middle hinge lobes 7, 11. In this case, the regulation for play-free movement of the hinge is performed at the surface of the indentation 43' that runs obliquely to the horizontal plane, and the screw 25 is protected from loosening on its own by the elastic forces of the sleeve 33, which is impinged upon in the axial direction by pressure forces, acting on the underside 35 of the screw head 27.

The screw 25 that is the object of the invention imparts a uniform, durable action to the hinges described above. It has been shown that the stability of the hinge action can be regulated and generally remains approximately the same, even after several thousand movements of the hinge.

It has been shown that only very minor spreading of the hinge action appears during automatic screwing of screw connection 1, which in an advantageous exemplary embodiment lies in the range of 5 Ncm. In an advantageous exemplary embodiment the smallest hinge action is approximately 2 Ncm, and the greatest hinge action is approximately 7 Ncm. It has been shown that the screw 25 according to the invention has a spreading of only about 2 Ncm to 3 Ncm for articulated joints with a loose fit, and only about 5 Ncm to 6 Ncm for articulated joints that are produced fitted together.

Furthermore, it has been found that in the screw connection 1 according to the invention the screw 25 cannot loosen on its own, and for example after 20,000 hinge movements still has a loosening torque of approximately 2 Ncm.

A clearance play of up to 0.06 mm can be compensated for by use of the screw 25 according to the invention. A very good, precisely adjustable hinge action can thus be achieved, even for single piece production with a poor or inferior fit. The screw 25 according to the invention can also be readily used in plastic holders. All of the exemplary embodiments of the screw connection 1 described with reference to the figures are characterized in particular by high functional reliability, and assure protection from the screw connection loosening on its own, as well as regulation of the hinge action. Moreover, the screw and sleeve, connected together as one piece, can be reused numerous times. The screw connection explained in the figures is characterized in that a coupling is provided between the sleeve and the screw as seen in the axial direction, and thus in the direction of movement in which the screw is screwed or unscrewed.

During screwing and unscrewing of the screw the sleeve is moved with the screw in the axial direction. The screw can rotate freely with reference to the sleeve, so that a relative rotational motion between the screw and the sleeve is possible, as described above. On the other hand, the specialized design of the through opening that accepts the screw, and in particular the sleeve, assures that the sleeve is prevented from twisting. The anti-twist protection is provided by longitudinal grooves, and optionally by additional, radially projecting nibs that engage from the outside into the sleeve material and prevent twisting of same. This design provides great security against inadvertent or unintended loosening of the screw.

What is claimed is:

1. A screw connection for at least two hinge parts, comprising a screw configured for interconnecting the at least two hinge parts, wherein the hinge parts engage one inside the other and have an upper hinge lobe, a lower hinge lobe, and at least one middle hinge lobe, said screw having a screw head and a screw shank that extends through a first through opening in the upper hinge lobe and extends through a second through opening in the middle hinge lobe, with a thread permitting the screw shank to be screwed into the lower hinge lobe, and comprising a sleeve that surrounds the screw shank, has elastic properties, and interacts with the upper and middle hinge lobes when the screw is in a screwed-in state, whereby the diameter of the second through opening is less than or equal to the diameter of the first through opening, and the screw has at least one bearing surface for contacting the sleeve with at least one engaging surface that is aligned in the direction of movement in which the screw is unscrewed, the improvement comprising:

the screw shank having an annular collar that, in the screwed-in state is situated in the middle hinge lobe, said annular collar providing said at least one engaging surface to retain and support said sleeve thereagainst when said screw shank and sleeve are removed from said middle lobe, and wherein the annular collar acts as a guide collar for insertion of said screw into said second through opening in said middle lobe and wherein in the circumferential surface of the first through opening is provided at least one longitudinal groove, running parallel or essentially parallel to the direction of movement in which the screw is screwed and unscrewed for protecting the sleeve from twisting.

2. A screw connection for at least two hinge parts, comprising:

at least two hinge parts which engage one inside the other and comprise an upper hinge lobe with a first through opening the circumferential surface of which has at least one longitudinal groove, a lower hinge lobe, and at least one middle hinge lobe having a second through opening, each of the through openings having a diameter and the diameter of the second through opening being less than or equal to the diameter of the first through opening;

a screw configured for interconnecting the at least two hinge parts, said screw having a screw head and a screw shank that extends through the first through opening in the upper hinge lobe and extends through the second through opening in the middle hinge lobe, with a thread permitting the screw shank to be screwed into the lower hinge lobe, the screw having a screwed in state, and the screw having at least one bearing surface and an annular collar with at least one engaging surface that is aligned in the direction of movement in which the screw is unscrewed, the annular collar, when in the screwed-in state, being situated in the second through opening of the middle hinge lobe, thereby providing a guide member for insertion of said screw into said second through opening; and a sleeve with elastic properties that surrounds the screw shank and is engaged and supported by said at least one engaging surface of said annular collar, said sleeve being positioned to interact with the upper and middle hinge lobes when the screw is in the screwed-in state, and is protected from twisting by said longitudinal groove in said first opening, which longitudinal groove runs essentially parallel to the direction of movement of said screw.

3. The screw connection according to claim 2 wherein the sleeve on its end opposite from the annular collar is constructed to be supported directly on the underside of the screw head or on a cylindrical projection.

4. The screw connection according to claim 3 wherein the diameter of the screw head or the diameter of the cylindrical projection is less than the diameter of the first through opening.

5. The screw connection according to claim 2, wherein the sleeve in the screwed-in state is deformed in such a way that the sleeve material is pressed into an annular space formed between the screw shank and the second through opening.

6. The screw connection according to claim 5, wherein the sleeve material is pressed into at least one longitudinal groove formed in said first through opening parallel to or essentially parallel to the direction of movement in which the screw is screwed and unscrewed.

7. A screw connection for at least two hinge parts, comprising a screw configured for interconnecting the at least two hinge parts, wherein the hinge parts engage one inside the other and have an upper hinge lobe, a lower hinge lobe, and at least one middle hinge lobe, said screw having a screw head and a screw shank that extends through a first through opening in the upper hinge lobe and extends through a second through opening in the middle hinge lobe, with a thread permitting the screw shank to be screwed into the lower hinge lobe, and comprising a sleeve that surrounds the screw shank, has elastic properties, and interacts with the upper and middle hinge lobes when the screw is in a screwed-in state, whereby the diameter of the second through opening is less than or equal to the diameter of the first through opening, and the screw has at least one bearing surface for contacting the sleeve with at least one engaging surface that is aligned in the direction of movement in which the screw is unscrewed, the improvement comprising:

the screw shank having an annular collar that, in the screwed-in state is situated in the middle hinge lobe, said annular collar providing said at least one engaging surface to retain and support said sleeve thereagainst, and wherein the first through opening, having a circumferential surface, is provided with at least one longitudinal groove in said circumferential surface running parallel or essentially parallel to the direction of movement in which the screw is screwed and unscrewed for protecting the sleeve from twisting.

8. A screw connection for at least two hinge parts, comprising a screw configured for interconnecting the at least two hinge parts, wherein the hinge parts engage one inside the other and have an upper hinge lobe, a lower hinge lobe, and at least one middle hinge lobe, said screw having a screw head and a screw shank that extends through a first through opening in the upper hinge lobe and extends through a second through opening in the middle hinge lobe, with a thread permitting the screw shank to be screwed into the lower hinge lobe, and comprising a sleeve that surrounds the screw shank, has elastic properties, and interacts with the upper and middle hinge lobes when the screw is in a screwed-in state, whereby the diameter of the second through opening is less than or equal to the diameter of the first through opening, and the screw has at least one bearing surface for contacting the sleeve with at least one engaging surface that is aligned in the direction of movement in which the screw is unscrewed, the improvement comprising:

the screw shank having an annular collar that, in the screwed-in state is situated in the middle hinge lobe, said annular collar providing said at least one engaging surface to retain and support said sleeve thereagainst, and wherein the second through opening has an annular cross section and a circumferential wall, and wherein at least a portion of said circumferential wall that faces toward the screw head is conically tapered.

* * * * *